(12) United States Patent
Sakurai et al.

(10) Patent No.: US 7,257,306 B2
(45) Date of Patent: Aug. 14, 2007

(54) ELECTRO-OPTICAL DEVICE AND ELECTRONIC APPARATUS

(75) Inventors: Shinji Sakurai, Suwa (JP); Takeshi Kondo, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/075,155

(22) Filed: Mar. 8, 2005

(65) Prior Publication Data

US 2005/0213924 A1     Sep. 29, 2005

(30) Foreign Application Priority Data

Mar. 25, 2004   (JP) .............................. 2004-089408

(51) Int. Cl.
*G02B 6/00* (2006.01)
*G02F 1/1333* (2006.01)
*G02F 1/135* (2006.01)

(52) U.S. Cl. ..................... 385/147; 349/50; 349/58

(58) Field of Classification Search ................ 385/147; 349/61–65
See application file for complete search history.

(56) References Cited

U.S. PATENT DOCUMENTS

| | | | | |
|---|---|---|---|---|
| 5,926,237 A | * | 7/1999 | Yun et al. ....................... | 349/58 |
| 6,956,630 B2 | * | 10/2005 | Ariyoshi et al. ............... | 349/63 |
| 6,956,637 B2 | * | 10/2005 | Satonaka ..................... | 349/187 |
| 2002/0041482 A1 | * | 4/2002 | Sun et al. ..................... | 361/681 |
| 2003/0025850 A1 | * | 2/2003 | Nitto et al. .................... | 349/58 |
| 2003/0128307 A1 | * | 7/2003 | Ito et al. ........................ | 349/58 |

FOREIGN PATENT DOCUMENTS

| | | |
|---|---|---|
| CN | 1424615 | 6/2003 |
| CN | 1467543 | 1/2004 |
| JP | 2002-055329 | 2/2002 |
| JP | 2002-090736 | 3/2002 |
| JP | 2002-098958 | 4/2002 |
| JP | 2002-311417 | 10/2002 |
| JP | 2003-058065 | 2/2003 |
| JP | 2003-162232 | 6/2003 |
| JP | 2003-167235 | 6/2003 |
| JP | 2004-021257 | 1/2004 |
| KR | 1999-0069947 | 9/1999 |

OTHER PUBLICATIONS

Communication from Korean Patent Office regarding corresponding application.
Communication from Chinese Patent Office regarding counterpart application.

* cited by examiner

*Primary Examiner*—Tina M Wong
(74) *Attorney, Agent, or Firm*—Harness, Dickey & Pierce, P.L.C.

(57) ABSTRACT

An electro-optical device comprises an electro-optical panel in which an electro-optical material is arranged, an illumination device for radiating visible light onto the electro-optical panel, and a metal frame divided into a plurality of frames each being formed of a metal material, and the plurality of divided frames being integrally formed with each other such that the electro-optical panel and the illumination device are supported together.

7 Claims, 13 Drawing Sheets

ELECTRO-OPTICAL DEVICE AND ELECTRONIC APPARATUS

RELATED APPLICATIONS

This application claims priority to Japanese Patent Application No. 2004-089408 filed Mar. 25, 2004 which is hereby expressly incorporated by reference herein in its entirety.

BACKGROUND

1. Technical Field

The present invention relates to an electro-optical device and an electronic apparatus. More specifically, the present invention relates to an electro-optical device in which a module can be reduced in size and which can provide enhanced reliability when respective components constituting the module are supported, and to an electronic apparatus comprising the electro-optical device.

2. Related Art

Portable apparatuses such as cellular phones or other mobile communication apparatuses indispensably use an electro-optical device, such as a liquid crystal display device, as a display medium. In this case, since portability is important, a portable apparatus of reduced weight, size, and profile is demanded. Accordingly, an electro-optical device, such as a liquid crystal display device, of reduced weight, size, and profile is also demanded. Here, conventionally, in order to meet the demand, there is a case in which respective components constructing the electro-optical device are fixed without using fixing components, such as solder beads, from the viewpoint of an electro-optical device of reduced weight or profile. For example, the liquid crystal display panel and the backlight unit are fixed to each other via a double-sided adhesive tape. Thus, the fixing components such as solder beads are not required, and thus the electro-optical device can be reduced in weight. Further, there is no need to secure a certain height for using the fixing components, and thus the electro-optical device can be reduced in profile.

However, in recent years, with the progress of the portable apparatus of reduced size, while a module including a liquid crystal display panel or the like reduced in size, a display unit of the liquid crystal display panel or the like becomes large in size for the purpose of visibility, which results in a problem in that it is difficult to secure an area for applying the above-mentioned double-sided adhesive tape. If the area for applying the double-sided adhesive tape is small, the fixing force of the entire double-sided adhesive tape is reduced, and the supporting force for the components that are fixed by the double-sided adhesive tape is reduced. Accordingly, it is expected that reliability when the respective components are integrally supported may be reduced.

The present invention has been made in consideration of the above problems, and it is an object of the present invention to provide an electro-optical device in which a module can be reduced in size and which can provide enhanced reliability when respective components constituting the module are integrally supported, and to provide an electronic apparatus having the electro-optical device.

SUMMARY

In order to solve the above-mentioned problems and to achieve the above-mentioned objects, an electro-optical device according to the present invention comprises an electro-optical panel including an electro-optical material, an illumination device for radiating visible light onto the electro-optical panel, and a metal frame divided into a plurality of frames each being formed of a metal material, and the plurality of frames being directly connected to each other and supporting the electro-optical panel and the illumination device.

In such a manner, the electro-optical panel and the illumination device are supported by the metal frame, and thus these elements are integrally coupled with each other to form a module. The term "integrally coupled" as used herein refers to a condition wherein two objects are attached to each other so as not to easily separate form each other. The metal frame is made of the metal material, and thus the degree of strength can be secured even when it is formed by bending a thin plate. As such, the metal frame is formed by bending the thin plate made of the metal material, and thus the metal frame can be reduced in size. Further, the electro-optical panel and the illumination device are supported by the metal frame, and thus the entire module including the electro-optical panel and so on can be reduced in size. In addition, the metal frame is formed of the plurality of frames, and thus, by directly coupling the frames with each other, the electro-optical panel and the illumination device can be supported only by the metal frame. For this reason, even though the double-sided adhesive tape is not used to support the electro-optical panel and so on, the electro-optical panel and so on can be integrally supported. Accordingly, the entire module is reduced in size, and the area for applying the double-sided adhesive tape is reduced. Therefore, the reduction in reliability due to the area for applying the double-sided adhesive tape when the electro-optical panel or the like is supported can be suppressed, and thus reliability of the support can be enhanced. As a result, it has advantages in that the module can be reduced in size and reliability when the respective components constituting the module are integrally supported can be enhanced. Further, the frame is formed of the metal material, and thus a heat release effect increases owing to high thermal conductivity and heat generated in the illumination device can be released to an exterior. As a result, bad effects such as operational defects due to an excessive increase in temperature can be reduced. In addition, since the frame is formed of the metal material, the degree of strength of the entire module can be enhanced. As a result, even when a strong external force such as an external shock is applied, owing to the enhanced degree of strength, the device is hardly damaged.

Further, according to a preferred aspect of the present invention, each of the plurality of frames includes a plurality of sides, at least two side including at least two coupling portions, the coupling portion being provided in pairs at positions facing each other in the plurality of frames. Accordingly, when the plurality of frames which form the metal frame having the plurality of sides are coupled with each other, two or more sides are coupled with each other via the coupling portions, the entire metal frame can be coupled in good balance. Further, since two or more coupling portions are provided in one side, the sides which are coupled via the coupling portions are more surely coupled with each other. As a result, it has an advantage in that reliability when the respective components constituting the module are integrally supported can be further enhanced.

Further, according to a preferred aspect of the present invention, each of the coupling portions has a coupling hole formed in one frame and a projection formed in the other frame, and the projection is inserted into the coupling hole by an elastic force inherent in the frame, such that the projection is coupled with the coupling hole. Accordingly, when the frames which have the coupling portions in pairs are coupled with each other, the projection is elastically deformed to be coupled with the coupling hole, since each frame formed of the thin plate has an elastic force. Due to the elastic deformation, the projection is easily inserted into and coupled with the coupling hole. As a result, the frames can be easily coupled with each other without using tools, and thus it has an advantage in that an increase in manufacturing cost can be suppressed. Further, after the projection is coupled with the coupling hole, the elastically deformed frames recover original shapes, and thus the combination between the projection and the coupling hole is maintained. As a result, reliability of the maintenance of the coupled frames can be enhanced, and thus it has an advantage in that reliability when the respective components constituting the module are integrally supported can be further enhanced.

Further, according to a preferred aspect of the present invention, the plurality of frames has a first frame which is positioned near the electro-optical panel and in which a display window is formed and a second frame which is positioned near the illumination device. Further, when the first frame and the second frame are integrally formed, the first frame and the second frame directly overlap each other such that the second frame is positioned outside the first frame. Accordingly, the first frame and the electro-optical panel can be positioned in place. That is, when the first frame and the second frame are integrally coupled with each other to support the electro-optical panel or the like, the first frame and the electro-optical panel directly contact each other. Thus, the electro-optical panel with respect to the first frame is accurately positioned in a set position to be supported by the metal frame. Further, in the first frame, the display window which allows the content displayed on the electro-optical panel to be viewed is provided. The electro-optical panel is accurately positioned at the set position with respect to the first frame as described above, and thus the position of the display unit of the electro-optical panel and the position of the display window can be more accurately aligned with each other. Thus, the display window can be formed to have a shape close to the shape of the display unit. As a result, there is no need for forming the display window in consideration of the positional deviation between the display window and the display unit of the electro-optical panel. Further, a portion other than the display unit can not be viewed through the display window. Thus, it has an advantage in that the appearance within the display window can be enhanced.

Further, according to a preferred aspect of the present invention, the plurality of frames has a first frame positioned near the electro-optical panel and a second frame positioned near the illumination device. Further, when the first frame and the second frame are integrally formed, the first frame and the second frame directly overlap each other such that the first frame is positioned outside the second frame. Accordingly, even when the shape of the projection of the coupling portion is opened in a direction that the first frame and the second frame are separated from each other, the leakage of light from the opened portion in a direction that the electro-optical panel is viewed can be suppressed. That is, when the frame is formed of the thin plate, the projection can be formed by deforming the thin plate. And then, in this case, the projection is formed to be anchored with respect to the direction that the frames are separated from each other. For this reason, the projection is opened and projected from the plate constituting the frame. In this case, the opening is opened in a direction of regulating the separation of the frames. Further, since the electro-optical panel is positioned inside the frame, the projection projects outward. For this reason, when the frames overlap each other, the projection is formed in a frame which is positioned inside. Thus, if the first frame is positioned outside the second frame, the projection is formed in the second frame. Accordingly, the projection is formed in the second frame, and further, in the second frame, the first frame and the second frame are separated from each other in a direction opposite to a direction that the first direction is provided. Thus, the opening of the projection is opened in a direction opposite to a direction that the electro-optical panel is provided. As a result, even when light from the illumination device leaks from the opening of the projection, light does not leaks toward the display unit of the electro-optical panel. Therefore, it has an advantage in that the reduction in visibility of the electro-optical panel can be suppressed.

In the electro-optical device according to the present invention, temporary tacking holes provided in the first frame are engaged with temporary tacking projections provided in the illumination device, respectively, such that the first frame and the illumination device are temporarily tacked to each other.

Further, according to a preferred aspect of present invention, a flexible wiring board is mounted on the electro-optical panel, and the second frame is divided into at least two frames and the divided frames are respectively coupled with the first frame. Further, one of the divided frames supports the electro-optical panel and the illumination device, together with the first frame, and the other of the divided frames supports the electro-optical panel, the illumination device, and the flexible wiring board, together with the first frame. Accordingly, when the flexible wiring board is bent at an opposite side to the display unit of the electro-optical panel and is supported by the second frame, the second frame is divided into the portion which supports the components including the flexible wiring board and the portion which supports the components not including the flexible wiring board. Accordingly, at the portion which supports the components not including the flexible wiring board, the total thickness of the device including the metal frame can be thinned. Further, the flexible wiring board can be surely supported by the first frame and the second frame which support the components including the flexible wiring board. As a result, since the thickness of a desired portion of the module can be thinned, it has an advantage in that the module can be reduced in size.

In the electro-optical device according to the present invention, temporary tacking notches provided in the first frame are engaged with temporary tacking projections provided in the illumination device, respectively, such that the first frame and the illumination device are temporarily tacked to each other.

Further, an electronic apparatus according to the present invention comprises an electro-optical device as described in any one of the above-mentioned aspects. Accordingly, an electronic apparatus having a compact electro-optical device with the enhanced degree of strength and high heat release effect can be implemented, without causing the integrally formed module to be separated. As such, since the compact electro-optical panel can be formed, the entire electronic apparatus can be compact. Further, as the electro-optical device is reduced in size, other portions have enough room, and thus the versatility of possible design can be increased and performance can be enhanced. Further, since there is no case in which the integrally formed module is separated, a high-quality electronic apparatus free from failures can be implemented. Further, since the electro-optical device has the enhanced degree of strength, even when the strong external force is applied thereto, the electronic apparatus can be hardly damaged. In addition, the electro-optical device has high heat release effect, operational defects or the like of the electro-optical device due to an excessive increase in temperature can be reduced. Therefore, a high-quality electronic apparatus can be implemented.

DETAILED DESCRIPTION

Hereinafter, embodiments of an electro-optical device and an electronic apparatus according to the present invention will be described in detail with reference to the drawings. Moreover, the embodiments are not intended to limit the present invention. Further, in the embodiments described below, elements include ones that can be replaced or can be easily implemented by a person of ordinary skill, or ones that are substantially identical to those in the embodiments. Further, in the following description, as an example of an electro-optical device, a liquid crystal display device is exemplarily described, but the present invention is not limited to this example. For example, the present invention can be applied to an electro-optical device, such as an electroluminescent device, a plasma display device, an electrophoretic display device, a device using an electron emission element, or the like. Further, in the following description, a surface on which a display unit of a liquid crystal display panel is provided is called an upper surface and a surface opposite thereto is called a lower surface.

First Embodiment

Figure 1:
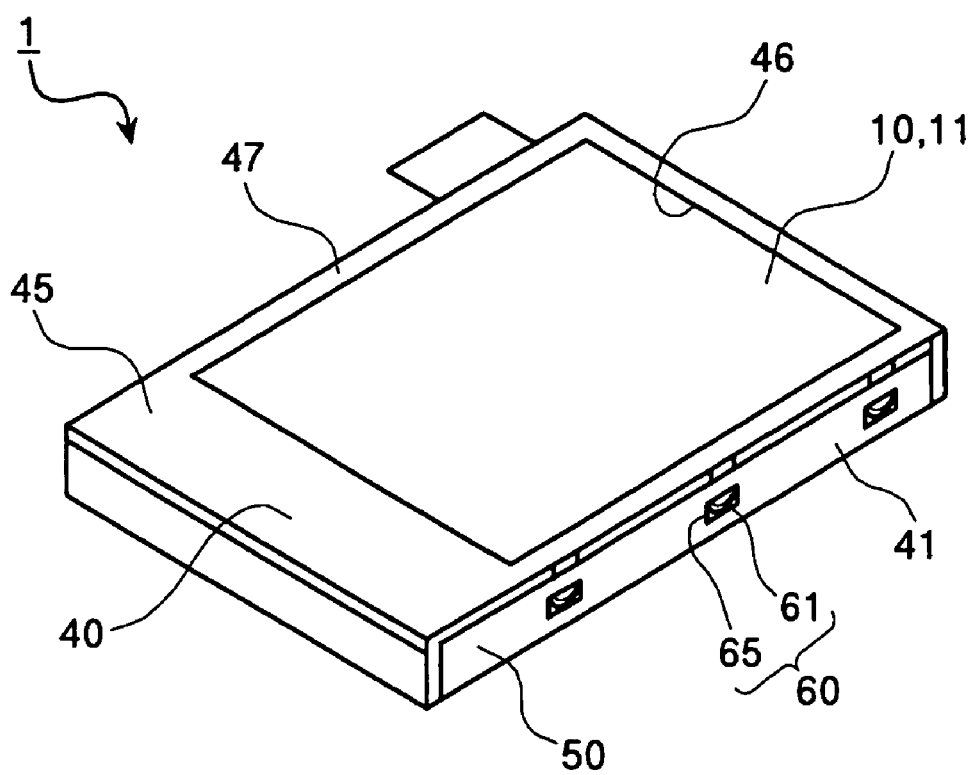
FIG. 1 is a perspective view showing a first embodiment of a liquid crystal display device according to the present invention.

FIG. 1 is a perspective view showing a first embodiment of a liquid crystal display device according to the present invention. The liquid crystal display device 1, which is an example of an electro-optical device, is formed in such a manner that external main portions thereof are covered with a metal frame 40. In the metal frame 40, a liquid crystal display panel 10 serving as an electro-optical panel described below and a backlight unit 20 serving as an illumination device are housed. The metal frame 40 is made of a metal material such as stainless steel. Moreover, apart from stainless steel, the metal material may include aluminum, phosphor bronze, beryllium copper, or the like. The metal frame 40 has a first frame 45 and a second frame 50. The first frame 45 is positioned at an upper surface of the liquid crystal display device and the second frame 50 is positioned at a lower surface of the liquid crystal display device. Further, in the first frame 45, a rectangular display window 46 is formed, and a display unit 11 of the liquid crystal display panel 10 is disposed inside the display window 46.

Further, in a state in which the first frame 45 and the second frame 50 are coupled with each other, the metal frame 40 has approximately a rectangular parallelepiped shape. In such a manner, in the state in which the first frame 45 and the second frame 50 are coupled with each other, as viewed from the display window 46, at two opposite sides of four sides of the rectangular metal frame 40, the first frame 45 and the second frame 50 overlap each other. At the overlap portions, the second frame 50 is positioned outside the first frame 45. Further, at the overlap portions of the two sides, coupling portions 60 are formed, and three coupling portions 60 are formed in one side. Further, the coupling portions 60 are formed in pairs at the overlap portions of the first frame 45 and the second frame 50. Projections 61 are formed in the first frame 45 and coupling holes 65 are formed in the second frame 50. The coupling portions 60 are formed in side surfaces 41 when a surface on which the display window 46 is formed is called an upper surface 47. The first frame 45 and the second frame 50 are integrally coupled with each other by coupling the projections 61 and the coupling holes 65 with each other. On the side surfaces 41 in which the coupling portions 60 are not formed, the first frame 45 and the second frame 50 are formed without overlapping each other and without interfering with each other.

Figure 2:
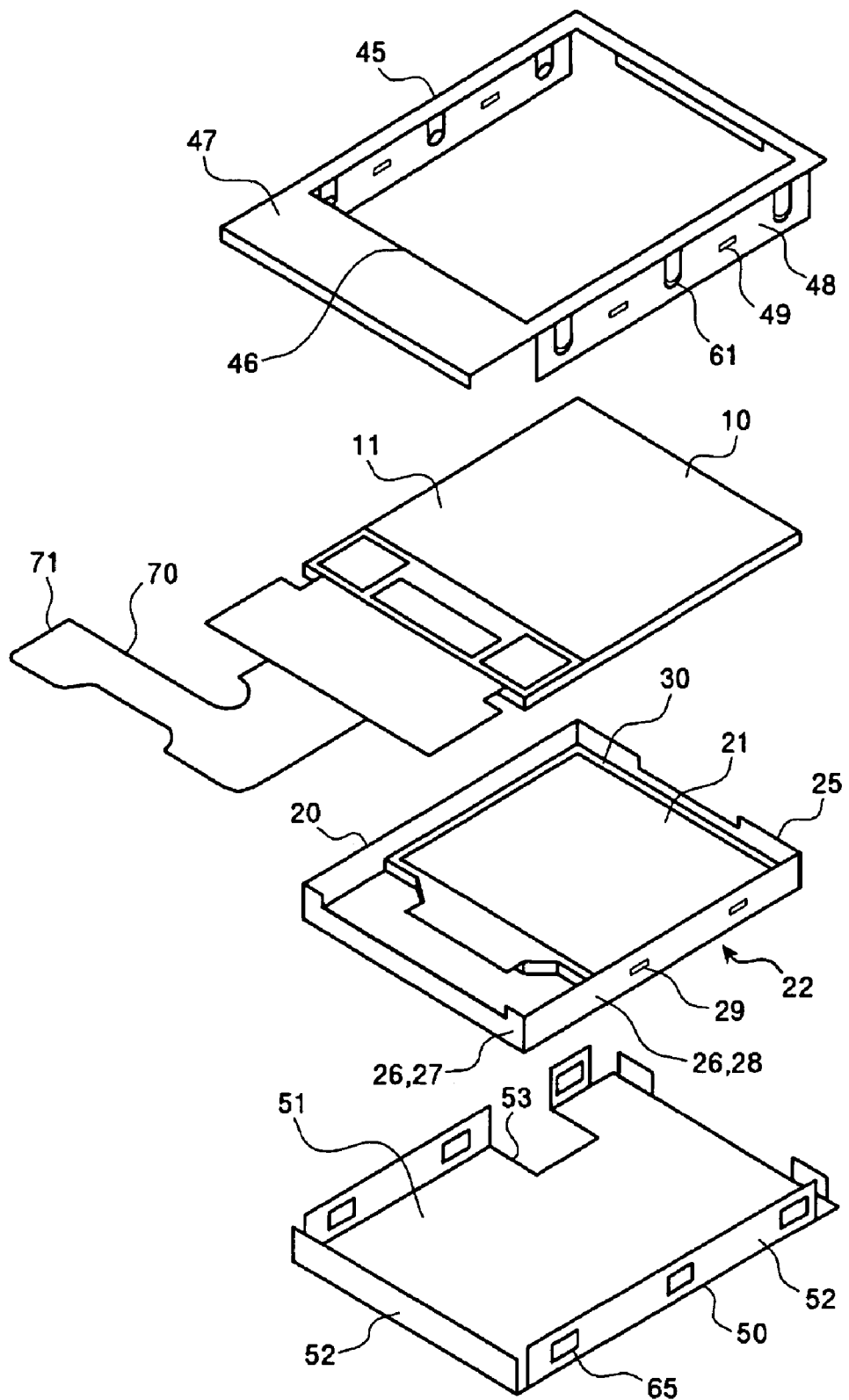
FIG. 2 is an exploded perspective view of the liquid crystal display device shown in FIG. 1.

FIG. 2 is an exploded perspective view of a liquid crystal display device shown in FIG. 1. Between the first frame 45 and the second frame 50, the liquid crystal display panel 10 and the backlight unit 20 are provided. The first frame 45 is formed of a thin plate such as stainless steel and an upper surface 47 thereof has an approximately rectangular shape. Further, on the upper surface 47, the rectangular display window 46 is formed as described above. The first frame 45 has side surfaces 48 bent from four sides of the rectangle, and the side surfaces 48 are formed to have the same length as those of the sides of the upper surface 47 or are formed partially with respect to the sides. Further, on the side surfaces 48 that are formed on the longitudinal sides of the upper surface 47 among the side surfaces 48, the projections 61 are formed. Three projections 61 are formed on each side surface 48. Further, on the side surfaces 48 on which the projections 61 are formed, temporary tacking holes 49, which serve as holes for temporarily tacking to the backlight unit 20, are formed. Two temporary tacking holes 49 are formed on each side surface 48. Further, the upper surface 47 is painted black.

Figure 3:
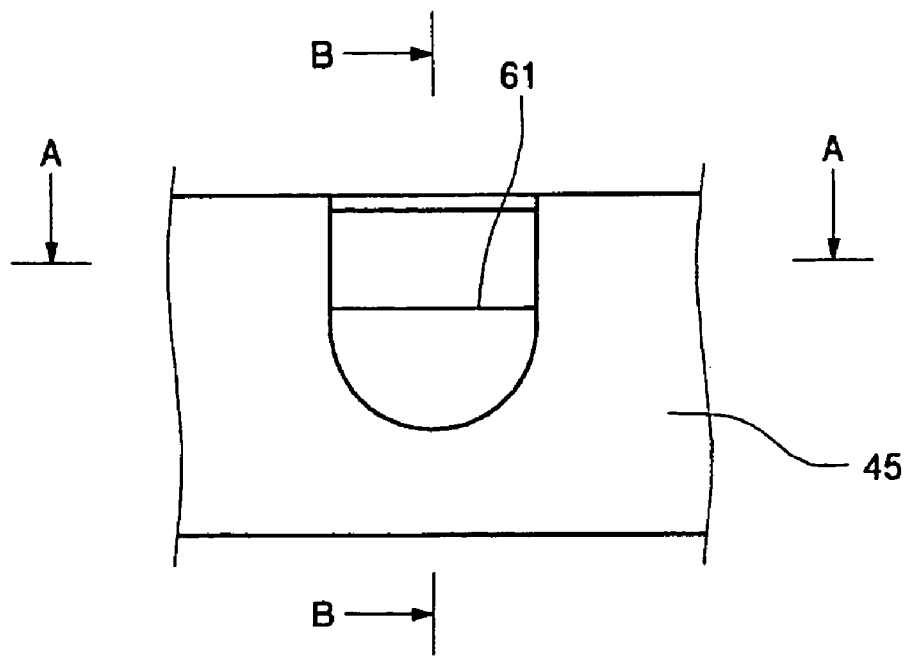
FIG. 3 is a detailed view of a projection.
Figure 4:
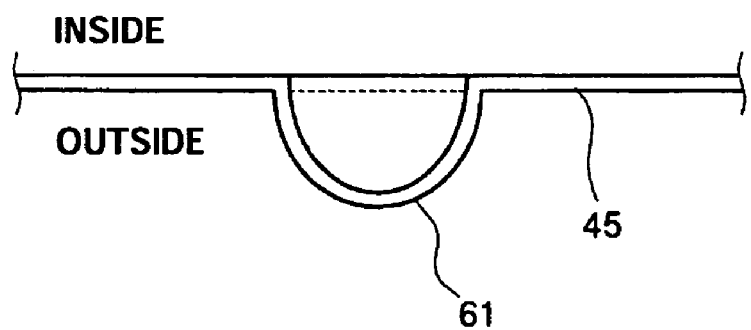
FIG. 4 is a cross-sectional view taken along the line A-A of FIG. 3.
Figure 5:
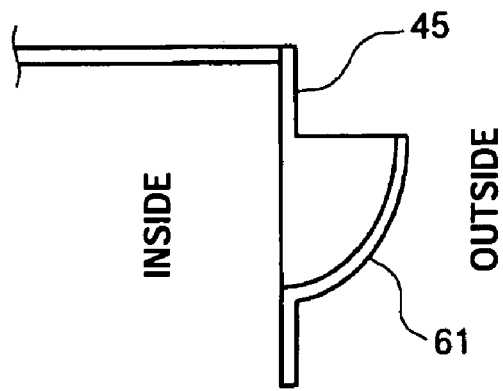
FIG. 5 is a cross-sectional view taken along the line B-B of FIG. 3.

FIG. 3 is a detailed view of the projection. FIG. 4 is a cross-sectional view taken along the line A-A of FIG. 3. FIG. 5 is a cross-sectional view taken along the line B-B of FIG. 3. The projection 61 is formed of a thin plate, like the first frame 45. The detailed shape of the projection is constructed in such a way that, when the side surface 48 is viewed from the front, an upper portion is formed parallel to the upper surface 47 and a lower portion has an approximately semicircular shape that is convex downward. When the projection 61 is viewed from the upper portion, that is, from the upper surface 47 (FIG. 4), the projection 61 is formed to have an approximately semicircular shape that is convex outward and that opens upward. Further, when the projection 61 is viewed in a longitudinal cross-sectional view (FIG. 5), the projection 61 has the upper portion projecting outward and is connected to the side surface 48 of the first frame 45 while curving downward. Specifically, the projection 61 projects outward while curving as it goes from the lower portion toward the upper surface 47. That is, the projection 61 is formed to have an approximately semicircular shape in which the upper portion is convex outward, and the inside of the semicircle is connected to the inside of the first frame 45. For this reason, the upper portion of the projection 61 opens upward. Further, the side surface 48 opens from the projection 61 to the upper surface 47.

The liquid crystal display panel 10 has an electro-optical material arranged therein and is also formed to have a rectangular thin plate shape. Further, on the liquid crystal display panel 10, a flexible wiring board 70 is mounted. On one plate-shaped surface of the liquid crystal display panel 10, the display unit 11 is formed. On a surface of the flexible wiring board 70 opposite to the surface on which the display unit 11 of the liquid crystal display panel 10 is formed, LEDs (Light Emitting Diodes) 72 described below are mounted. Further, on the flexible wiring board 70, elements or wiring lines that drive the liquid crystal display panel 10 or the LED are formed. Further, at an end portion of the flexible wiring board 70, a connecting portion 71 that is connected to an external terminal is provided.

The backlight unit 20 has a light guiding plate 21, a reflecting plate 22, and a plastic frame 25. The light guiding plate 21 and the reflecting plate 22 both have approximately rectangular shapes, and the reflecting plate 22, whose reflecting surface is directed upward, is provided below the light guiding plate 21. Further, around an upper surface of the light guiding plate 21, an adhesive portion 30 having a fine width is provided. Further, the plastic frame 25 is formed to have side walls 26 that surround the rectangular light guiding plate 21 and the reflecting plate 22 on all sides. A rectangular shape formed by outer portions of the side walls 26, when the side walls 26 are viewed from the top, is somewhat smaller than a rectangular shape formed by an inner portion surrounded by the side surfaces 48, when the first frame 45 is viewed from the bottom. In addition, a rectangular shape formed by inner portions of the side walls 26, when the side walls 26 are viewed from the top, is somewhat larger than the rectangular shape of the liquid crystal display panel 10. Further, one of short side walls 27, which are the side walls 26 of short sides of the rectangular shape, is formed away from the light guiding plate 21 and the reflecting plate 22, and the other side wall 26 is formed near the light guiding plate 21 and the reflecting plate 22. That is, the light guiding plate 21, the reflecting plate 22, and the plastic frame 25 are constructed in such a way that one short side wall 27 of two short side walls 26 in the longitudinal direction of the rectangular shape is separated paced from the light guiding plate 21 and the reflecting plate 22. Further, in long side walls 28, which are the side walls 26 of long sides of the plastic frame 25, temporary tacking projections 29 that serve as projections for temporarily tacking to the first frame 45 are formed. Two temporary tacking projections 29 are formed on each long side wall 28. Further, the temporary tacking projections 29 are formed in both long side walls 28.

The second frame 50 is formed of a thin plate, like the first frame 45, and has an approximately rectangular lower surface 51. Further, in the lower surface 51, a relieving portion 53 at which the connecting portion 71 of the flexible wiring board 70 is positioned at the time of assembling the liquid crystal display device 1 is formed. The second frame 50 has side surfaces 52 bent from four sides of the rectangular shape and the side surfaces 52 are formed to have the same length as those of the sides of the lower surface 51 or are formed partially with respect to the sides. Further, on the side surfaces 52 that are formed on the longitudinal sides of the lower surface 51 among the side surfaces 52, coupling holes 65 of the coupling portions 60 are formed. Three coupling holes 65 are formed on each side surface 52. The coupling holes 65 are formed at positions corresponding to the projections 61 that are formed in the first frame 45. Further, an inner distance between the side surfaces 52 of the second frame 50 on which the coupling holes 65 are formed is somewhat larger than an outer distance between the side surfaces 48 of the first frame 45 on which the projections 61 are formed.

The electro-optical device according to the first example has a configuration as described above, and, hereinafter, the operation thereof will be described. To begin with, when assembling the liquid crystal display device 1, the liquid crystal display panel 10 on which the flexible wiring board 70 is mounted is fitted onto the backlight unit 20. As for assembling orientation, the liquid crystal display panel 10 is oriented such that the surface opposite to the display unit 11 faces the backlight unit 20, and the backlight unit 20 is oriented such that the surface near the light guiding plate 20 faces the liquid crystal display panel 10. Further, the portion where the light guiding plate 21 and the reflecting plate 22 of the backlight unit 20 are separated from the side wall 26 faces the flexible wiring board 70. In such a manner, the liquid crystal display panel 10 is fitted into the inner portion surrounded by the side walls 26 of the backlight unit 20. At this time, since the adhesive portion 30 having the fine width is provided around the light guiding plate 21, the liquid crystal display panel 10 is adhered to the adhesive portion 30 and is temporarily tacked to the backlight unit 20.

Next, in a state in which the backlight unit 20 and the liquid crystal display panel 10 are integrally formed, the first frame 45 is fitted onto the display unit 11 of the liquid crystal display panel 10. In this case, the integrally formed backlight unit 20 and liquid crystal display panel 10 are positioned such that the display unit 11 of the liquid crystal display panel 10 is directed upward and then the first frame 45 is fitted onto the integrally formed backlight unit 20 and liquid crystal display panel 10 from the top such that the upper surface 47 is directed upward. At this time, the positions of the display unit 11 and the display window 46 formed in the first frame 45 are aligned with each other. When doing so, the temporary tacking projections 29 formed in the plastic frame 25 are engaged with the temporary tacking holes 49 formed in the first frame 45. Accordingly, the liquid crystal display panel 10 and the backlight unit 20 are temporarily tacked to the first frame 45 and are positioned with respect to the first frame 45.

Figure 6:
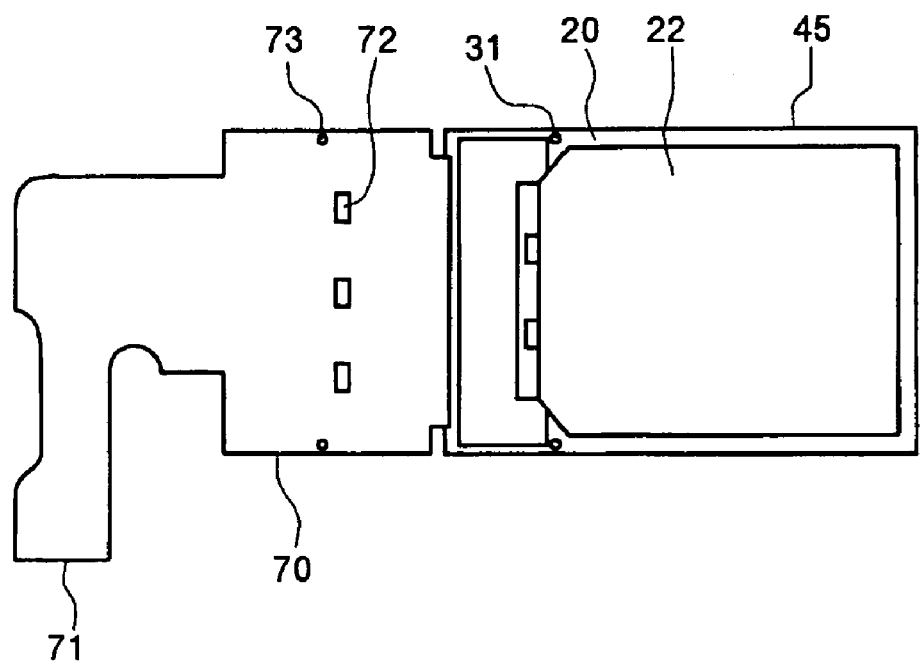
FIG. 6 is a diagram showing a state in which a backlight unit or the like is fitted into a first frame.
Figure 7:
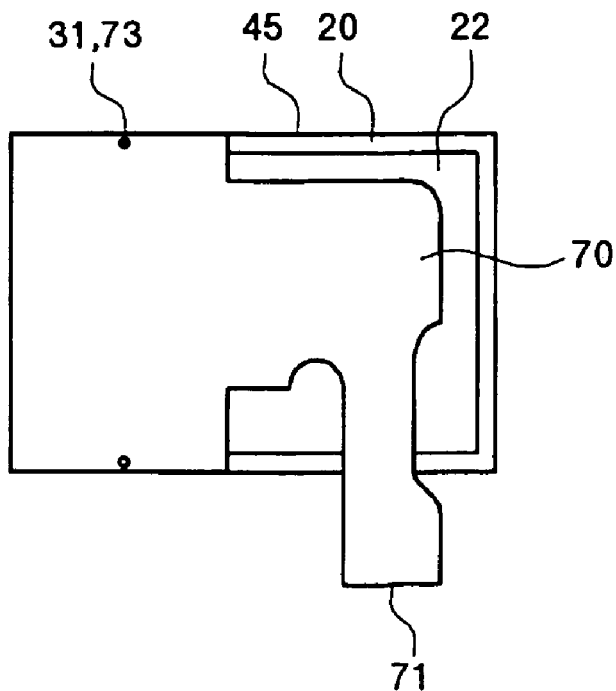
FIG. 7 is a diagram showing a state in which a flexible wiring board is bent.
Figure 8:
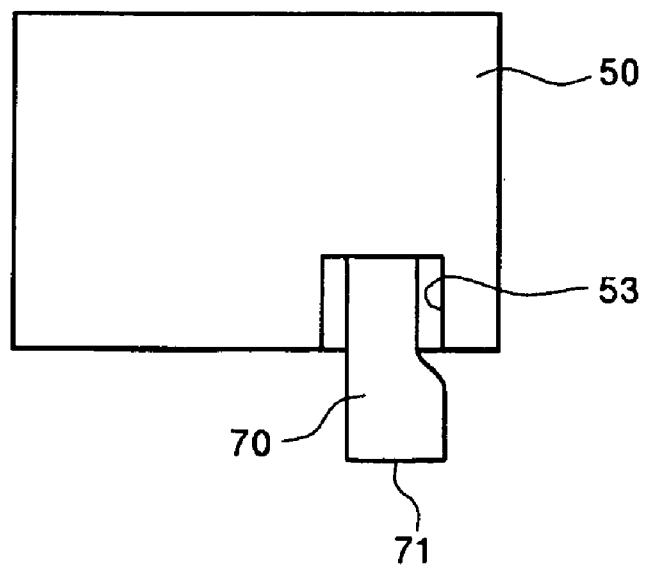
FIG. 8 is a diagram showing a state in which a second frame is fitted onto the first frame.

FIG. 6 is a diagram showing a state in which the backlight unit is fitted into the first frame, viewed from the bottom. FIG. 7 is a diagram showing a state in which the flexible wiring board is bent. FIG. 8 is a diagram showing a state in which the second frame is fitted onto the first frame. When the state in which the liquid crystal display panel 10 and the backlight unit 20 are integrally fitted into the above-mentioned first frame 45 is viewed from the bottom, that is, from the reflecting plate 22 of the backlight unit 20 fitted into the first frame 45, LEDs 72 are mounted on the flexible wiring board 70. Further, engaging holes 73 are formed in the flexible wiring board 70 and engaging pins 31 are provided in the backlight unit 20 (FIG. 6). Before the second frame 50 is fitted onto the backlight unit 20 and so on, the flexible wiring board 70 is bent toward the reflecting plate 22 (FIG. 7). Then, the engaging pins 31 formed in the backlight unit 20 are inserted into and engaged with the engaging holes 73 formed in the flexible wiring board 70 such that the flexible wiring board 70 is temporarily tacked to the backlight unit 20 and is positioned with respect to the backlight unit 20. In such a manner, the flexible wiring board 70 is bent and positioned, and thus the LEDs 72 mounted on the flexible wiring board 70 are arranged with respect to the light guiding plate 21, at positions suited to the irradiation of light to the light guiding plate 21.

In such a manner, the second frame 50 is fitted onto the bent flexible wiring board 70 (FIG. 8). At this time, the second frame 50 is fitted onto the flexible wiring board 70 such that the relieving portion 53 formed in the second frame 50 is positioned in correspondence with the connecting portion 71 of the flexible wiring board 70. When the second frame 50 is fitted onto the flexible wiring board 70, the side surfaces 48 of the first frame 45 are disposed outside the side walls 26 of the plastic frame 25 of the backlight unit 20. Further, the projections 61 are formed on the side surfaces 48 that are disposed outside the long side walls 28 among the side walls 26. As described above, the second frame 50 is oriented such that the connecting portion 71 of the flexible wiring board 70 and the relieving portion 53 of the second frame 50 are aligned with each other. When doing so, the side surfaces 52 on which the coupling holes 65 are formed, among the side surfaces 52 of the second frame 50, face the side surfaces 48 of the first frame 45 on which the projections 61 are formed.

The projections 61 project outward as described above. Specifically, when going to the upper surface 47 of the first frame 45, the projections 61 project outward while curving. Further, the second frame 50 is formed of the thin plate such as stainless steel and thus the second frame 50 has an elastic force. For this reason, when the second frame 50 is fitted onto the first frame 45, the side surfaces 52 of the second frame 50 contact the projections 61. In this case, since the projections 61 project outward while curving, the side surfaces 52 of the second frame 50 are elastically deformed according to outward projections of the projections 61. Accordingly, the side surfaces 52 on which the coupling holes 65 are formed are spread outward while curving. Then, the coupling holes 65 formed on the side surfaces 52 of the second frame 50 reach the projections 61, such that the projections 61 are inserted into the coupling holes 65. Thus, the side surfaces 52 which are curving outward recover their original shapes by means of the elastic force of the second frame 50. Accordingly, the projections 61 and the coupling holes 65 are coupled with each other, and thus the first frame 45 and the second frame 50 are coupled with each other. As such, the flexible wiring board 70 fitted inside the second frame 50 is constructed such that the connecting portion 71 thereof is exposed by means of the relieving portion 53. Thus, the connection of the connecting portion 71 to the external terminal can be easily realized.

Figure 9:
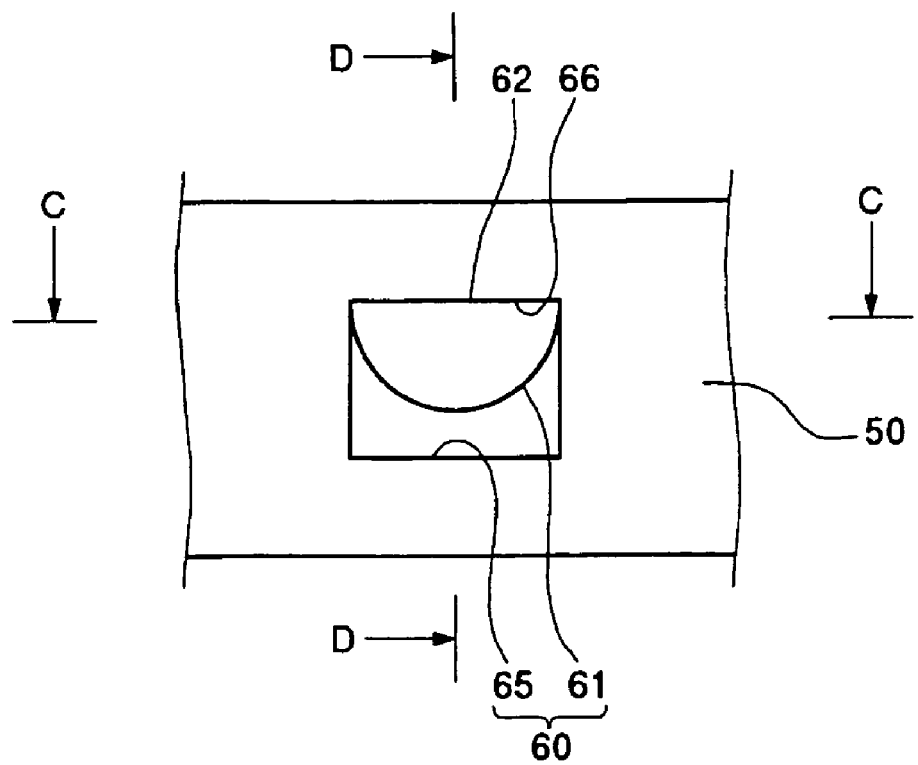
FIG. 9 is a detailed view of a coupling portion.
Figure 10:
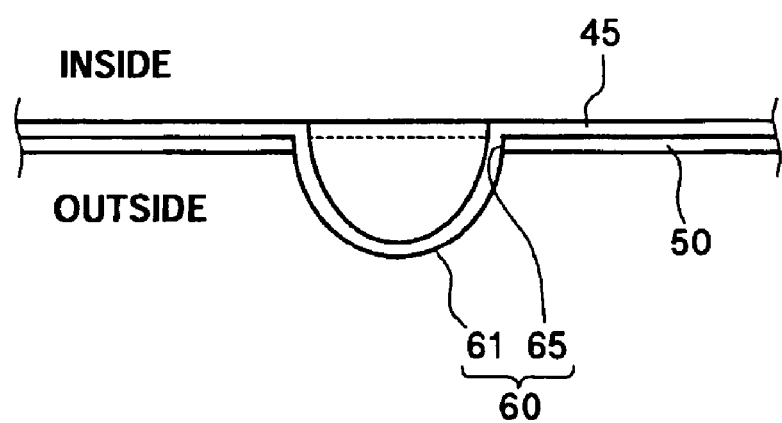
FIG. 10 is a cross-sectional view taken along the line C-C of FIG. 9.
Figure 11:
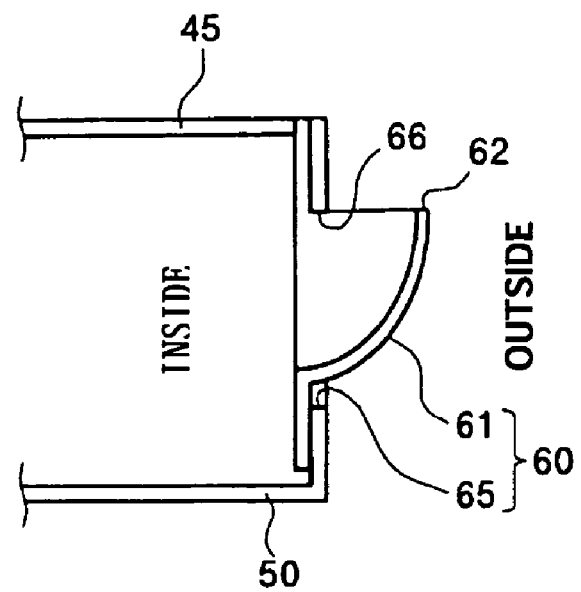
FIG. 11 is a cross-sectional view taken along the line D-D of FIG. 9.

FIG. 9 is a detail view of the coupling portion. FIG. 10 is a cross-sectional view taken along the line C-C of FIG. 9. FIG. 11 is a cross-sectional view taken along the line D-D of FIG. 9. In the coupling portion 60 having the projection 61 and the coupling hole 65 that are coupled with each other, the projection 61 is inserted into the coupling hole 65 and the upper portion of the projection 61, which serves as a regulating portion 62, contacts an upper side 66 of the coupling hole 65. As such, the regulating portion 62 of the projection 61 contacts the upper side 66 of the coupling hole 65, and thus the coupling hole 65 is regulated to move downward. The direction in which the coupling hole 65 moves downward is a direction in which the first frame 45 and the second frame 50 are separated from each other. In this case, however, the movement in this direction is regulated by means of the coupling portions 60, and thus the coupled first frame 45 and second frame 50 remain to be coupled with each other by means of the regulating portions 62.

Figure 12:
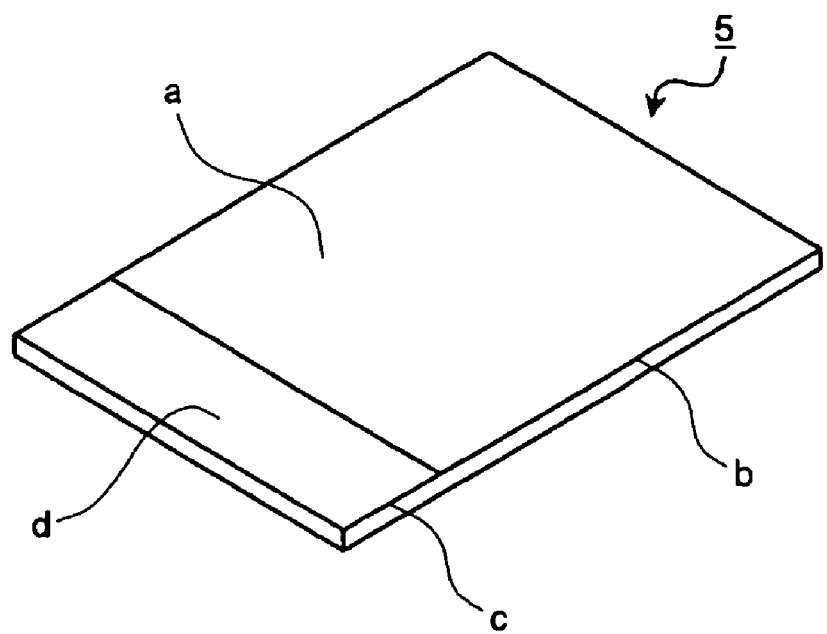
FIG. 12 is a diagram showing a liquid crystal display device that is not covered with a metal frame.
Figure 13:
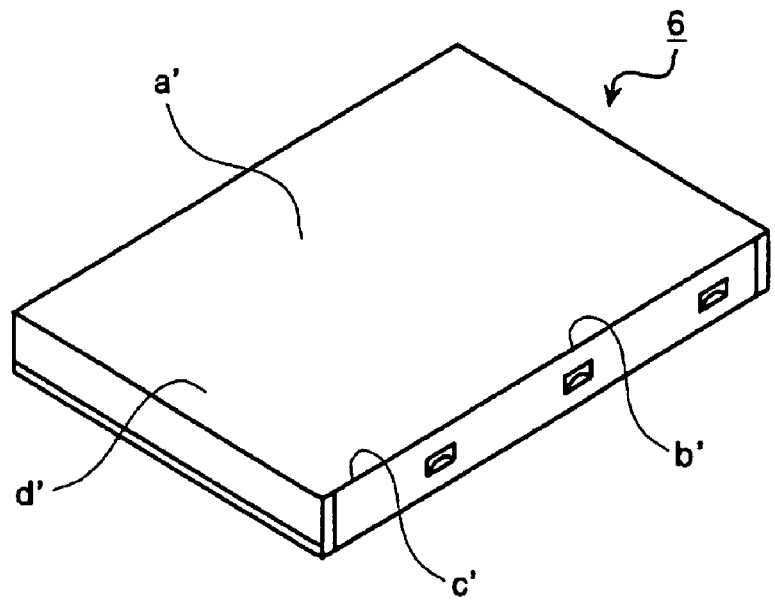
FIG. 13 is a diagram showing a liquid crystal display device that is covered with a metal frame.
Figure 14:
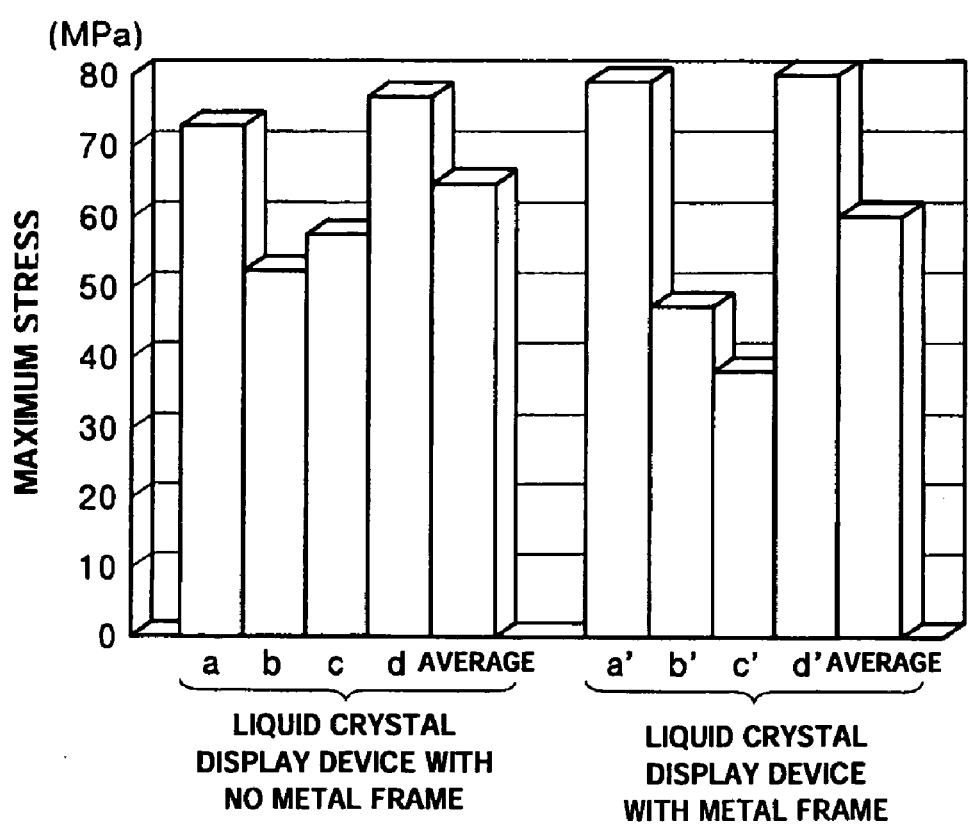
FIG. 14 is a diagram showing the maximum stress of each portion of a liquid crystal display device.

FIG. 12 is a diagram showing a liquid crystal display panel that is not covered with a metal frame. FIG. 13 is a diagram showing a liquid crystal display panel that is covered with a metal frame. FIG. 14 is a diagram showing the maximum stress of each portion of the liquid crystal display device. As regards a liquid crystal display device 5 with no metal frame and a liquid crystal display device 6 with a metal frame, the strengths are tested respectively and the difference of the strengths due to the presence/absence of the metal frame 40 is measured. As for the liquid crystal display device 5 with no metal frame, a portion around the center of a surface opposite to the liquid crystal display panel 10 is represented by a, a portion in the longitudinal direction of a longitudinal side corresponding to a is represented by b, a portion around an end of the longitudinal side to which the flexible wiring board 70 is connected is represented by c, and a portion around the center of the end to which the flexible wiring board 70 is connected is represented by d. Similarly, as for the liquid crystal display device 6 with the metal frame, portions corresponding to the respective portions a, b, c, and d of the liquid crystal display device 5 with no metal frame are referred to as a', b', c', and d', respectively. Results of drop tests of the liquid crystal display devices are shown in FIG. 14. As shown in FIG. 14, the maximum stress of each of the portions b' and c' of the liquid crystal display device 6 with the metal frame drastically decreases as compared to the maximum stress of each of the portions b and c of the liquid crystal display device 5 with no metal frame. Further, the average maximum stress of the liquid crystal display device 6 with the metal frame drastically decreases as compared to the average maximum stress of the liquid crystal display panel 5 with no metal frame.

The above-described liquid crystal display device 1 uses the metal frame 40, which is formed by bending a thin plate made of a metal material, as a component for integrally forming the module of the liquid crystal display device 1, and the liquid crystal display panel 10 and the backlight unit 20 are housed together in the metal frame 40. Thus, the module of the liquid crystal display device 1 can be reduced in size. Further, the metal frame 40 is divided into the first frame 45 and the second frame 50, which are directly coupled with each other, and thus the liquid crystal display panel 10 and the backlight unit 20 can be supported only by the metal frame 40. As a result, the module can be reduced in size, and reliability when the respective components constituting the module are integrally supported can be enhanced.

Further, the metal frame 40 is formed of a metal material such as stainless steel, and thus it has high thermal conductivity and a high heat release effect. Accordingly, heat generated from the LEDs 72, which serve as a light source of the backlight unit 20, can be radiated outside via the metal frame 40. As a result, detrimental effects such as operational defects due to an excessive increase in temperature can be reduced. Moreover, as a material for the metal frame 40, in addition to stainless steel, aluminum, phosphor bronze, beryllium copper, or the like may be used. For example, when low weight is important, aluminum is used, and when a heat release effect is important, phosphor bronze or beryllium copper is used. That is, a suitable material may be used according to purpose.

Further, since the metal frame 40 integrally housing the liquid crystal display panel 10 and the backlight unit 20 is formed of the metal material, as is apparent from the above-mentioned test result, the strength is enhanced. That is, as is apparent from the test result, when the metal frame 40 is provided in the liquid crystal display device 1, the maximum stress due to a drop shock decreases and thus the strength to the shock is enhanced. As a result, even when a strong external force such as an external shock is applied, the strength is enhanced and thus the device is hardly damaged.

Further, the coupling portions 60 have the projections 61 which are provided on the side surfaces 48 of two opposite sides as viewed from the upper surface 47 of the first frame 45 and the coupling holes 65 which are provided on the side surfaces 52 of the second frame 50 corresponding to the side surfaces 48, respectively. As such, since the coupling portions 65 are formed on the side surfaces 48 and 52 of two paired opposite sides of the first frame 45 and the second frame 50, the first frame 45 and the second frame 50 are coupled with each other in good balance. Further, three coupling portions 60 are formed on each paired side surface 48 and 52, and thus the first frame 45 and the second frame 50 are more reliably coupled with each other. As a result, reliability when the respective components constituting the module of the liquid crystal display device 1 can be further enhanced.

As such, the coupling portions 60 have the projections 61 and the coupling holes 65, and thus the first frame 45 and the second frame 50 are easily coupled with each other without using tools or the like. As a result, the assembling process is simplified, and thus the manufacturing cost can be reduced. Further, the regulating portions 62 of the projections 61 contact the upper sides 66 of the coupling holes 65, and thus the projections 61 and the coupling holes 65 are regulated to move in the direction in which the first frame 45 and the second frame 50 are separated from each other. As a result, the reliability of maintaining the combination between the first frame 45 and the second frame 50 is enhanced, and thus the reliability when the respective components constituting the module of the liquid crystal display device 1 can be further enhanced.

Further, since the integrally formed liquid crystal display panel 10 and backlight unit 20 directly contact the first frame 45 to be positioned, the first frame 45 and the liquid crystal display panel 10 are assembled to be positioned according to a more accurately set positional relationship. Further, since the first frame 45 and the liquid crystal display panel 10 are assembled to be positioned according to a more accurately set positional relationship, the display unit 11 of the liquid crystal display panel 10 and the display window 46 of the first frame 45 are more accurately aligned with each other. Thus, the display window 46 can be formed to have a shape close to that of the display unit 11 of the liquid crystal display panel 10. As a result, there is no need for forming the display window 46 in consideration of a positional deviation between the display window 46 and the display unit 11 of the liquid crystal display panel 10. Therefore, a portion other than the display unit 11 can not be viewed through the display window 46, and thus the appearance within the display window 46 can be enhanced.

Further, since the upper surface 47 of the first frame 45 is painted black, in an electronic apparatus having the liquid crystal display device 1, the appearance at the time of viewing the display unit 11 is enhanced. That is, when painting is not performed, the metal material for the metal frame 40 is viewed with its original color from the exterior of the electronic apparatus. Accordingly, it is expected that the appearance is degraded. Thus, by coating the upper surface 47 of the first frame 45 with black, the original color of the metal material cannot be viewed, and thus the appearance can be suppressed from being degraded. Further, only the upper surface 47 is painted, and thus paint removal due to a scratch of the painted surface can be suppressed at the time of assembling the liquid crystal display device 1 or when the liquid crystal display device 1 is assembled into the electronic apparatus. If paint removal is caused, the removed parts may penetrate into the electronic apparatus. Accordingly, it is expected that operational defects are caused by the removed parts. According to the present invention, by painting only the upper surface 47 of the first frame 45, such problems can be suppressed. As a result, the appearance can be enhanced and operational defects of the liquid crystal display device 1 or the electronic apparatus can be suppressed. Moreover, as regards the painting of the upper surface 47, colors other than black may be used. By coating the upper surface 47 of the first frame 45 with a color that matches the appearance of the electronic apparatus, the appearance of the entire electronic apparatus can be enhanced.

Further, the liquid crystal display panel 10 and the backlight unit 20 are covered with the first frame 45 and the second frame 50, and the first frame 45 and the second frame 50 are coupled with each other to support the liquid crystal display panel 10 and the backlight unit 20. For this reason, at the time of assembling the liquid crystal display device 1, even when dust particles or the like penetrate between the liquid crystal display panel 10 and the backlight unit 20, the first frame 45 and the second frame 50 can be separated from each other to remove the dust particles, and thus the liquid crystal display panel 10 and the backlight unit 20 can be reused. In the case in which the liquid crystal display panel 10 and the backlight unit 20 are adhered to each other by means of the double-sided adhesive tape, if the dust particles penetrate between them, they can not be removed. And then, the liquid crystal display panel 10 or the like can not be reused as a product. According to the present invention, the liquid crystal display panel 10 or the like is covered with the metal frame 40 as described above, and thus the liquid crystal display panel or the like can be reused as a product. As a result, the number of defective products can be reduced, and thus the yield can be enhanced. Further, in such a manner, the manufacturing cost can be decreased.

Second Embodiment

Figure 15:
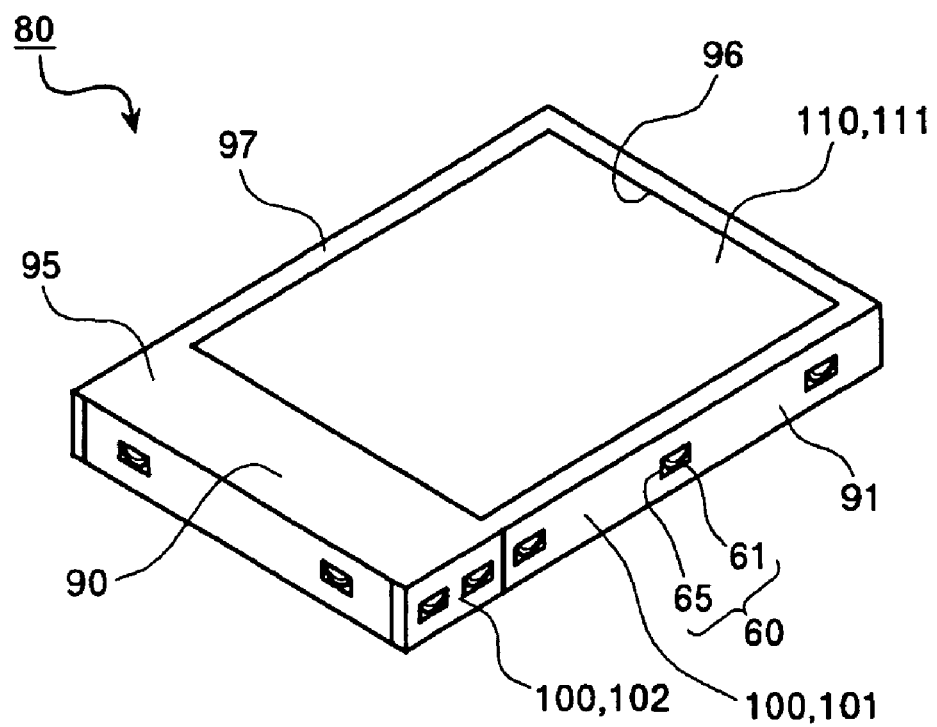
FIG. 15 is a perspective view showing a second embodiment of a liquid crystal display device according to the present invention.

An electro-optical device according to a second example has a configuration approximately equal to that of the electro-optical device according to the first example, except that the second frame is divided into two portions. Other elements are the same as those in the first example, and thus the same elements are represented by the same reference numerals and the descriptions of the same elements will be omitted. FIG. 15 is a perspective view showing a second embodiment of a liquid crystal display device according to the present invention. A liquid crystal display device 80 of the second embodiment is formed such that external main portions thereof are covered with a metal frame 90, like the liquid crystal display device 1 of the first embodiment. In the metal frame 90, a liquid crystal display panel 110 and a backlight unit 120 are housed. While the metal frame 40 of the first example has the first frame 45 and the second frame 50, the metal frame 90 of the second example has a second frame 100 which is divided into two portions. Accordingly, the metal frame 90 has a first frame 95, a backlight-unit-side second frame 101, and a flexible-wiring-board-side second frame 102. In the first frame 95, like the first frame 45 of the first example, a display window 96 is formed. A display unit 111 of the liquid crystal display panel 110 is disposed inside the display window 96. Further, a position where the second frame 100 is divided into the backlight-unit-side second frame 101 and the flexible-wiring-board-side second frame 102 is in the vicinity of an end of the display unit 111 of the liquid crystal display panel 110 near a flexible wiring board 140 described below.

The metal frame 90 of the second example has a rectangular shape when the metal frame 90 is viewed from the display window 96. At one of four sides of the rectangular shape, the first frame 95 and the backlight-unit-side second frame 101 or the first frame 95 and the flexible-wiring-board-side second frame 102 overlap each other. At the entire overlapped portion, the backlight-unit-side second frame 101 or the flexible-wiring-board-side second frame 102 is positioned outside the first frame 95. The backlight-unit-side second frame 101 and the flexible-wiring-board-side second frame 102 are divided in the longitudinal direction of the rectangular shape when the metal frame 90 is viewed from the display window 96. The first frame 95 and the backlight-unit-side second frame 101 or the flexible-wiring-board-side second frame 102 are coupled with each other by means of the coupling portions 60, like the metal frame 40 of the first example. As regards the positions and the number of the coupling portions 60 that combine the first frame 95 with the backlight-unit-side second frame 101, three coupling portions 60 are provided on each longitudinal side and two coupling portions 60 are provided on each side between the longitudinal sides. Further, as for the coupling portions 60 that combine the first frame 95 with the flexible-wiring-board-side second frame 102, two coupling portions 60 are provided on each longitudinal side and two coupling portions 60 are provided on each side between the longitudinal sides. The coupling portions 60 have the projections 61 formed in the first frame 95, as in the first embodiment, and the coupling holes 65 formed in the second frame 100, respectively. Further, when a surface on which the display window 96 is formed is called as an upper surface 97, the coupling portions 60 are formed on side surfaces 91.

Figure 16:
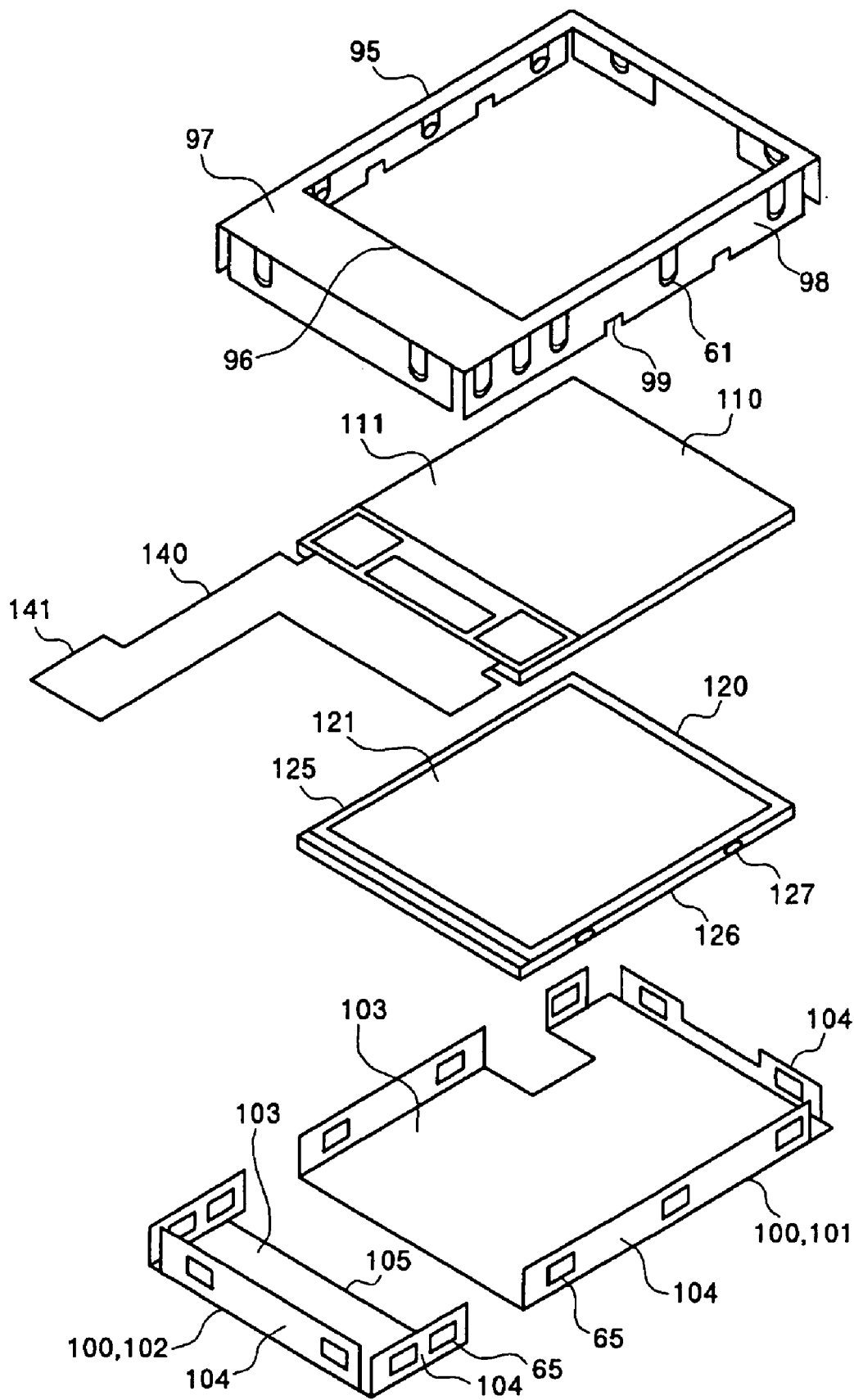
FIG. 16 is an exploded perspective view of the liquid crystal display device shown in FIG. 15.

FIG. 16 is an exploded perspective view of the liquid crystal display device shown in FIG. 15. Between the first frame 95 and the second frame 100 having the backlight-unit-side second frame 101 and the flexible-wiring-board-side second frame 102, the liquid crystal display panel 110 and the backlight unit 120 are provided. The first frame 95 has side surfaces 98 bent from four sides of the rectangular shape, and the side surfaces 98 are formed to have the same length as those of the sides of the upper surface 97 or partially formed with respect to the sides. Further, on the respective side surfaces 98, the projections 61 are formed. Five projections 61 are formed on each of the side surfaces 98 corresponding to the longitudinal sides of the upper surface 97, and two projections 61 are formed on each of the side surfaces 98 corresponding to short sides. Further, on the side surfaces 98 corresponding to the longitudinal sides, temporary tacking notches 99 that serve as notches for temporarily tacking to the backlight unit 120 are formed. Two temporary tacking notches 99 are formed on each side surface 98. Further, the upper surface 97 is painted black.

The liquid crystal display panel 110 is formed to have the same shape as that of the liquid crystal display panel 10 of the first embodiment. On the liquid crystal display panel 110, the display unit 111 is formed and also the flexible wiring board 140 is mounted. Like the flexible wiring board 70 of the first embodiment, LEDs 142 are mounted on a surface of the flexible wiring board 140 opposite to the surface on which the display unit 111 of the liquid crystal display panel 110 is formed. Further, at an end portion of the flexible wiring board 140, a connecting portion 141 is provided.

The backlight unit 120 has a light guiding plate 121, a reflecting plate 122, and a plastic frame 125, like the backlight unit 20 of the first embodiment. The light guiding plate 121 and the reflecting plate 122 both have approximately rectangular shapes, and the reflecting plate 122 of which a reflecting surface is directed upward is provided below the light guiding plate 121. The plastic frame 125 is formed to have a frame shape that surrounds the light guiding plate 121 and reflecting plate 122, without providing side walls, unlike the plastic frame 25 of the first embodiment. The shape of the plastic frame 125 when it is viewed from the top is somewhat smaller than a rectangular shape formed by an inner portion surrounded by the side surfaces 98, when the first frame 95 is viewed from the bottom. In addition, on side surfaces of long sides 126 of the plastic frame 125, temporary tacking projections 127 that serve as projections for temporarily tacking to the first frame 95 are formed. Two temporary tacking projections 127 are formed on each long side 126. Further, the temporary tacking projections 127 are formed in both long sides 126.

The second frame 100 is divided into the backlight-unit-side second frame 101 and the flexible-wiring-board-side second frame 102, as described above. When the second frame 100 is assembled as a portion of the metal frame 90 of the liquid crystal display device 80, a lower surface 103 thereof has a rectangular shape. The backlight-unit-side second frame 101 and the flexible-wiring-board-side second frame 102 are divided in the longitudinal direction of the rectangular shape. Further, the second frame 100 has side surfaces 104 bent from four sides of the rectangular shape. Specifically, the side surfaces 104 are formed on three sides of each of the backlight-unit-side second frame 101 and the flexible-wiring-board-side second frame 102. That is, the lower surface 103 of the metal frame 90 has a rectangular shape that is divided into the backlight-unit-side second frame 101 and the flexible-wiring-board-side second frame 102. Thus, the lower surface 103 of each of the backlight-unit-side second frame 101 and the flexible-wiring-board-side second frame 102 has a rectangular shape. Further, one side among four sides of the rectangle of one of the backlight-unit-side second frame 101 and the flexible-wiring-board-side second frame 102 faces one side of the other second frame and the backlight-unit-side second frame 101 and the flexible-wiring-board-side second frame 102 are fitted to form the second frame 100. Thus, opposite sides of the backlight-unit-side second frame 101 and the flexible-wiring-board-side second frame 102 do not have the side surfaces 104. For this reason, the side surfaces 104 are formed on three sides except for the opposite side on each of the backlight-unit-side second frame 101 and the flexible-wiring-board-side second frame 102. On each of the side surfaces 104, the coupling holes 65 are formed. On each of two longitudinal side surfaces 104 among three sides of the backlight-unit-side second frame 101, three coupling holes 65 are formed. On the remaining side surface 104, two coupling holes 65 are formed. Further, on each of the side surfaces 104 of the longitudinal direction of the second frame 102 of three sides of the flexible-wiring-board-side second frame 102, two coupling holes 65 are formed. Further, when the backlight-unit-side second frame 101 and the flexible-wiring-board-side second frame 102 fitted into each other are viewed from the top, the shape of an inner portion surrounded by the side surfaces 104 is somewhat larger than a rectangular shape formed by an outer portion defined by the side surfaces 98, when the first frame 95 is viewed from the bottom. Further, on the lower surface 103 of the flexible-wiring-board-side second frame 102, a relieving portion 105 is formed near the backlight-unit-side second frame 101.

The electro-optical device according to the second embodiment has the configuration described above, and, hereinafter, the operation thereof will be described. To begin with, when assembling the liquid crystal display panel 110, the first frame 95 is disposed such that the upper surface 97 of the first frame 95 is directed downward. With respect to the first frame 95, the liquid crystal display panel 110 is fitted inside the side surfaces 98 of the first frame 95 such that the display unit 111 is directed toward the first frame 95. At that time, the liquid crystal display panel 110 is directed such that the display unit 111 and the display window 96 of the first frame 95 are aligned with each other. Next, the backlight unit 120 is fitted onto the liquid crystal display panel 110 which is inserted into the first frame 95. The backlight unit 120 is directed such that the surface near the light guiding plate 121 faces the liquid crystal display panel 110. If the backlight unit 120 is inserted into the first frame 95 in such a manner, the temporary tacking projections 127 formed on the backlight unit 120 are engaged with the temporary tacking notches 99 of the first frame 95. Thus, the backlight unit 120 is temporarily tacked to the first frame 95 and simultaneously it is positioned with respect to the first frame 95.

Figure 17:
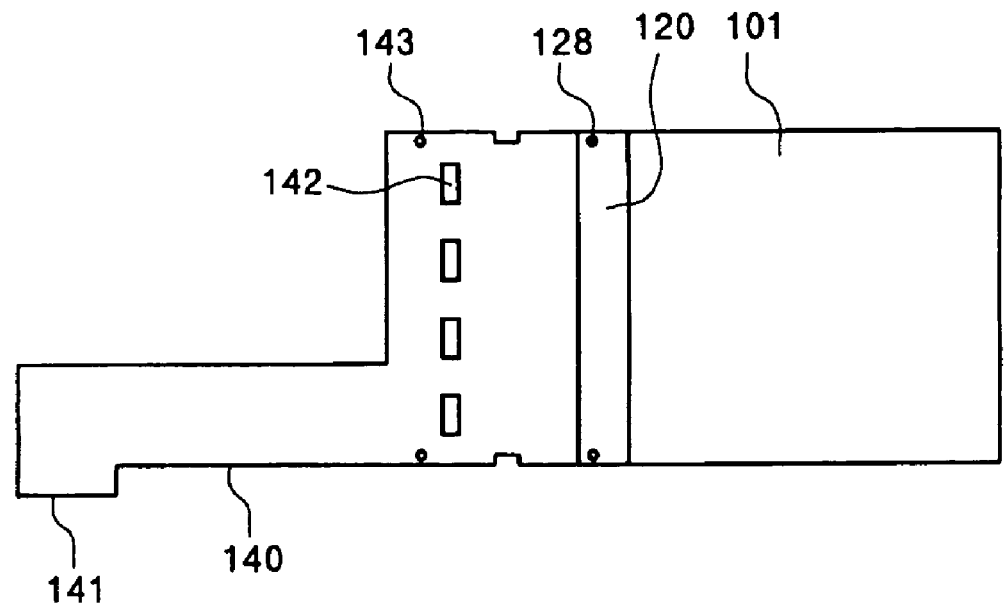
FIG. 17 is a diagram showing a state in which a backlight unit or the like is fitted into a first frame.
Figure 18:
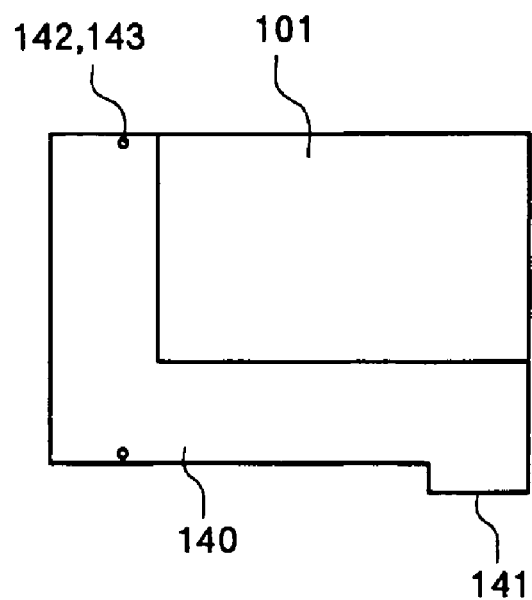
FIG. 18 is a diagram showing a state in which a flexible wiring board is bent.
Figure 19:
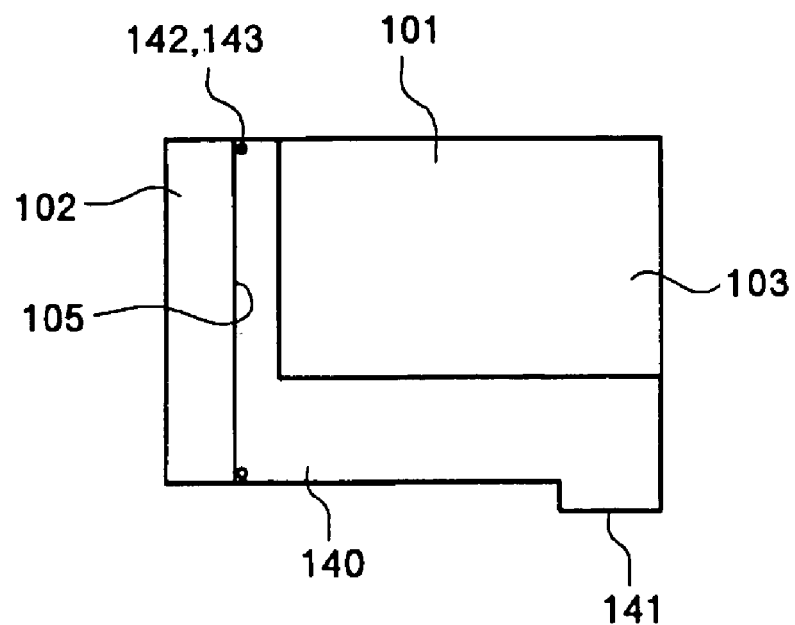
FIG. 19 is a diagram showing a state in which a second frame is fitted onto the first frame.

FIG. 17 is a diagram showing a state in which the backlight unit or the like is inserted into the first frame, as viewed from the bottom. FIG. 18 is a diagram showing a state in which the flexible wiring board is bent. FIG. 19 is a diagram showing the second frame fitted onto the first frame. As described above, in the state in which the backlight unit 120 is inserted into the first frame 95, the LEDs 142 and engaging holes 143 are formed on the flexible wiring board 140, like the flexible wiring board 70 of the first embodiment, as viewed from the backlight unit 120. On the backlight unit 120, engaging pins 128 are provided. The backlight-unit-side second frame 101 is fitted onto the backlight unit 120 with respect to the first frame 95 (FIG. 17). The backlight-unit-side second frame 101 is positioned at a side of the longitudinal direction of the first frame 95 where the flexible wiring board 140 of the liquid crystal display panel 110 is not provided. Further, the backlight-unit-side second frame 101 is fitted such that the side with no side surface 104 faces the flexible wiring board 140. By inserting the backlight-unit-side second frame 101 in such a manner, the projections 61 formed on the first frame 95 are coupled with the coupling holes 65 formed on the backlight-unit-side second frame 101. Thus, the backlight-unit-side second frame 101 is coupled with the first frame 95.

After the backlight-unit-side second frame 101 is inserted into the first frame 95, the flexible wiring board 140 is bent toward the backlight-unit-side second frame 101 (FIG. 18). And then, engaging pins 128 formed on the backlight unit 120 are inserted into and engaged with the engaging holes 143 formed on the flexible wiring board 140, such that the flexible wiring board 140 is temporarily tacked to the backlight unit 120 and is positioned with respect to the backlight unit 120. Thus, the LEDs 142 are arranged at positions suited to the irradiation of light to the light guiding plate 121. Further, if the flexible wiring board 140 is bent as described above, the flexible wiring board 140 is disposed near the lower surface 103 of the backlight-unit-side second frame 101. That is, when the first frame 95 is provided such that the upper surface 97 thereof is directed downward, the flexible wiring board 140 is disposed above the backlight-unit-side second frame 101.

As such, the flexible-wiring-board-side second frame 102 is fitted onto the bent flexible wiring board 140 (FIG. 19). The flexible-wiring-board-side second frame 102 is fitted such that the relieving portion 105 formed on the flexible-wiring-board-side second frame 102 is close to the backlight-unit-side second frame 101. By fitting the flexible-wiring-board-side second frame 102 in such a manner, the projections 61 formed on the first frame 95 are coupled with the coupling holes 65 formed on the flexible-wiring-board-side second frame 102. Accordingly, the flexible-wiring-board-side second frame 102 is coupled with the first frame 95. Further, even when the backlight-unit-side second frame 101 and the flexible-wiring-board-side second frame 102 are coupled, the flexible-wiring-board-side second frame 102 has the relieving portion 105, and thus the flexible wiring board 140 is exposed through the relieving portion 105. In addition, the flexible wiring board 140 is disposed near the lower surface 103 of the backlight-unit-side second frame 101.

The above-mentioned liquid crystal display device 80 uses the metal frame 90 as a component for integrally forming the module of the liquid crystal display device 80, like the first embodiment, and the liquid crystal display panel 110 and the backlight unit 120 are housed together in the metal frame 90. As a result, the module can be reduced in size, and reliability when the respective components constituting the module are integrally supported can be enhanced.

Further, the second frame 100 is divided into the backlight-unit-side second frame 101 and the flexible-wiring-board-side second frame 102. Of them, the backlight-unit-side second frame 101 is coupled with the first frame 95 to support the liquid crystal display panel 110 and the backlight unit 120. Further, the flexible-wiring-board-side second frame 102 supports the liquid crystal display panel 110, the backlight unit 120, and the flexible wiring board 140. Thus, the portion of the backlight-unit-side second frame 101 does not support the flexible wiring board 140, and thus the total thickness of the first frame 95 and the backlight-unit-side second frame 101 can be thinned by that amount. Further, the backlight-unit-side second frame 101 is coupled with the first frame 95 around the display unit 111 of the liquid crystal display panel 110. As a result, the total thickness around the display unit 111 can be reduced, and thus the liquid crystal display device 80 having reduced thickness around the display unit 111 can be implemented.

Moreover, the liquid crystal display device 1 or 80 has the overlapped portion of the first frame 45 or 95 and the second frame 50 or 100 such that the second frame 95 or 100 is disposed outside the first frame 45 or 95. Alternatively, the first frame may be disposed outside the second frame. In this case, when forming the coupling portions 60 on the metal frame as described above, the projections 61 are formed on the second frame and the coupling holes 65 are formed on the first frame. As such, when the projections 61 are provided on the second frame, the opened portions are directed toward the lower surface of the second frame, that is, in a direction opposite to the display unit of the liquid crystal display panel. When the backlight unit is lit up, it is expected that light leaks from the opened portions. In this case, however, since the opened portions are directed in the direction opposite to the display surface, as described above, leaked light can be prevented from being directed to the display unit. As a result, visibility of the liquid crystal display device can be prevented from decreasing.

Third Embodiment

Figure 20:
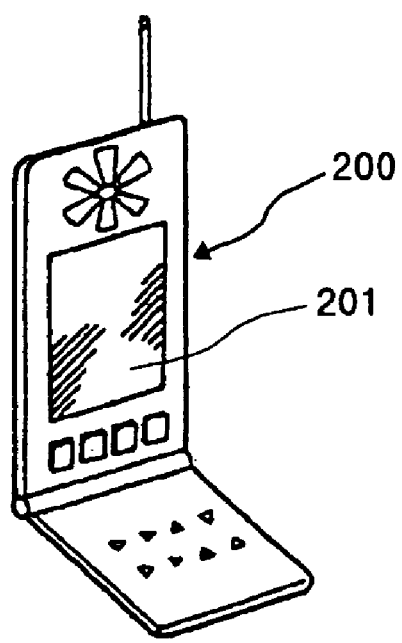
FIG. 20 is a diagram showing an example of an electronic apparatus.
Figure 21:
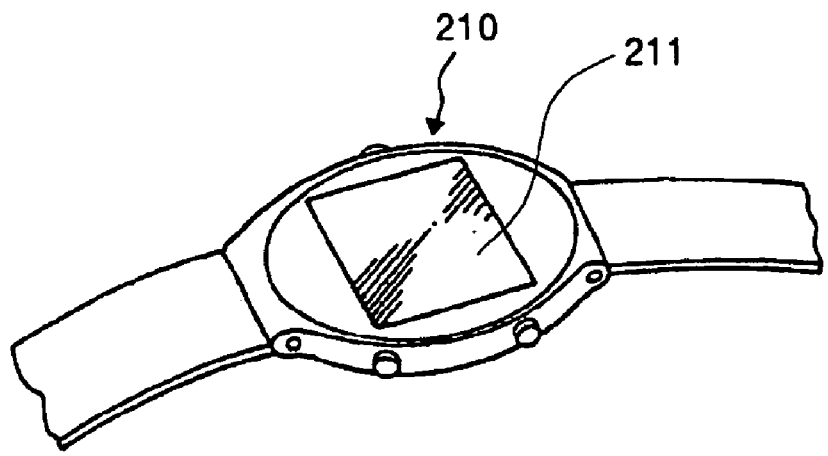
FIG. 21 is a diagram showing an example of an electronic apparatus.
Figure 22:
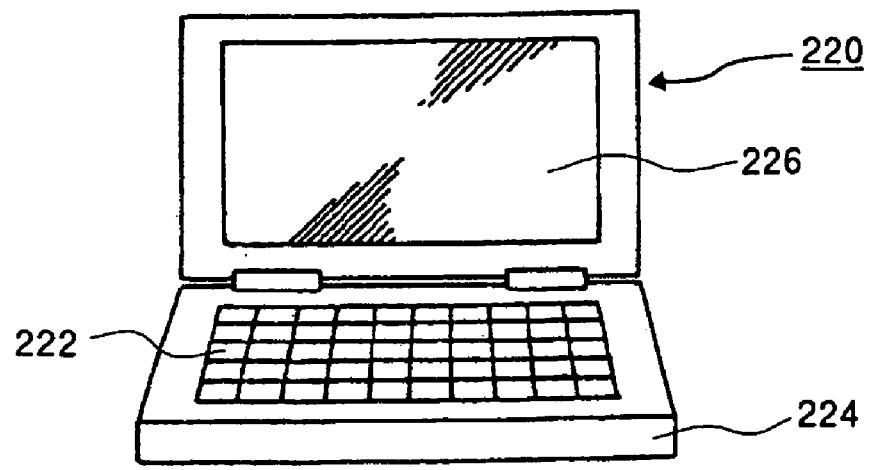
FIG. 22 is a diagram showing an example of an electronic apparatus.

In a third embodiment, specified examples of an electronic apparatus having the electro-optical device described in the first or second embodiment will be described. FIGS. 20 to 22 show examples of an electronic apparatus in which the above-mentioned electro-optical device according to the present invention is mounted. FIG. 20 is a perspective view showing an example of a cellular phone. In FIG. 20, reference numeral 200 denotes a cellular phone main body, and reference numeral 201 denotes a display unit formed of the electro-optical device according to the present invention. FIG. 21 is a perspective view showing an example of a wristwatch-type electronic apparatus. In FIG. 21, reference numeral 210 denotes a watch main body having a watch function built-in, and reference numeral 211 denotes a display unit made of the electro-optical device according to the present invention. Then, FIG. 22 is a perspective view showing an example of a portable information processing device, such as a word processor or a personal computer. In FIG. 22, reference numeral 220 denotes a portable information processing device, reference numeral 222 denotes an input unit such as a keyboard or the like, reference numeral 224 denotes an information processing device main body section in which an arithmetic device or a storage device is housed, and reference numeral 226 denotes a display unit made of the electro-optical device according to the present invention.

When the electro-optical device according to the present invention is used for the above-mentioned electronic apparatus, a high-quality electronic apparatus can be realized. Moreover, the electronic apparatus is not limited to the above-mentioned electronic apparatus. For example, an electronic apparatus in which an electro-optical device can be mounted may be used. Therefore, as an electronic apparatus having such an electro-optical device, for example, an electronic apparatus having an electro-optical device, such as a digital still camera, a vehicle monitor, a digital video camera, a viewfinder-type or monitor-direct-view-type video tape recorder, a car navigation device, a pager, an electronic organizer, an electronic calculator, a workstation, a videophone, a POS terminal, or the like may be exemplified, in addition to the cellular phone shown in FIG. 20, the wristwatch-type electrical apparatus shown in FIG. 21, and the portable information processing device.

INDUSTRIAL APPLICABILITY

As described above, the present invention is useful in reducing in size of the module of the electro-optical device. In particular, the present invention is suitable for enhancing reliability when the components constituting the module of reduced size are integrally supported.

What is claimed is:
1. An electro-optical device comprising:
an electro-optical panel including an electro-optical material;
a flexible wiring board mounted on the electro-optical panel;
an illumination device for radiating visible light onto the electra-optical panel; and
a metal frame assembly including first and second frames, each being formed of a metal material, the first and second frames being directly connected to each other with the electro-optical panel, the flexible wiring board, and the illumination device supported therebetween,
wherein the first frame is positioned on the electro-optical panel and has a display window formed therein, and the second frame is positioned on the illumination device,
each of the first and second frames including a planar lower surface and side surfaces extending away from the planar lower surface,
the first frame and the second frame being connected such that the first frame and the second frame directly overlap each other and the side surfaces of the second frame are positioned outside of the side surfaces of the first frame,
the second frame being divided into at least two separate components, the at least two separate components including a first component and a second component, the first component being coupled to the first frame with the electro-optical panel and the illumination device supported therebetween, the first component and the first frame forming a frame sub-assembly, the flexible wiring board being disposed outside of the frame sub-assembly, the second component being coupled to the first frame with the electro-optical panel, the flexible wiring board, and the illumination device supported therebetween.

2. The electro-optical device according to claim 1, wherein at least two of the side surfaces of each of the first and second frames each include at least two coupling portions, the coupling portions being provided in pairs at positions facing each other in the frames.

3. The electro-optical device according to claim 2, wherein each of the coupling portions of one of the first and second frames is a coupling hole, and each of the coupling portions of the other of the first and second frames is a projection, and the projections are inserted into the coupling holes by an elastic force inherent in the frames, such that the projections are coupled with the coupling holes.

4. The electro-optical device according to claim 1, wherein temporary tacking holes provided in the first frame are engaged with temporary tacking projections provided in the illumination device, respectively, such that the first frame and the illumination device are temporarily tacked to each other.

5. An electronic apparatus comprising an electro-optical device as claimed in claim 1.

6. The electro-optical device according to claim 1, wherein the first and second frames are each formed of a metal plate bent along side protions thereof to define the planar lower surface and the side surfaces.

7. An electro-optical device comprising:
an electro-optical panel including an electro-optical material;
a flexible wiring board mounted on the electro-optical panel;
an illumination device for radiating visible light onto the electro-optical panel; and
a metal frame assembly including first and second frames, each being formed of a metal material, the first and second frames being directly connected to each other with the electro-optical panel, the flexible wiring board, and the illumination device supported therebetween,
wherein the first frame is positioned on the electro-optical panel and has a display window formed therein, and the second frame is positioned on the illumination device,
the first frame and the second frame being connected such that the first frame and the second frame directly overlap each other and at least a portion of the second frame is positioned outside the first frame,
the second frame being divided into at least two components, a first of the second frame components being coupled to the first frame with the electro-optical panel and the illumination device supported therebetween, a second of the second frame components being coupled to the first frame with the electro-optical panel, the flexible wiring board, and the illumination device supported therebetween, the first and second of the second frame components being coupled to the first frame with a gap therebetween, the flexible wiring board extending through the gap and outside of the metal frame assembly.

* * * * *